(12) United States Patent
Adler et al.

(10) Patent No.: US 6,396,484 B1
(45) Date of Patent: May 28, 2002

(54) ADAPTIVE FREQUENCY TOUCHSCREEN CONTROLLER USING INTERMEDIATE-FREQUENCY SIGNAL PROCESSING

(75) Inventors: Robert Adler, Northbrook, IL (US); Arie Ravid, Newark; Geoffrey D. Wilson, Oxnard, both of CA (US)

(73) Assignee: Elo Touchsystems, Inc., Fremont, CA (US)

( * ) Notice: Subject to any disclaimer, the term of this patent is extended or adjusted under 35 U.S.C. 154(b) by 0 days.

(21) Appl. No.: 09/408,818

(22) Filed: Sep. 29, 1999

(51) Int. Cl.$^7$ .................................................. G09G 5/00
(52) U.S. Cl. ........................ 345/177; 345/173; 345/176
(58) Field of Search ............................... 345/173, 175, 345/177, 176

(56) References Cited

U.S. PATENT DOCUMENTS

| 3,692,936 A | 9/1972 | Moffit ........................... 178/18 |
| 4,642,423 A | 2/1987 | Adler |
| 4,644,100 A | 2/1987 | Brenner et al. |
| 4,645,870 A | 2/1987 | Adler |
| 4,698,461 A | 10/1987 | Meadows et al. |
| 4,700,176 A | 10/1987 | Adler |
| 4,746,914 A | 5/1988 | Adler |
| 4,791,416 A | 12/1988 | Adler |
| 4,825,212 A | 4/1989 | Adler et al. |
| 4,859,996 A | 8/1989 | Adler et al. |
| 4,880,665 A | 11/1989 | Adler et al. |
| RE33,151 E | 1/1990 | Adler |
| 5,072,427 A | 12/1991 | Knowles |

(List continued on next page.)

FOREIGN PATENT DOCUMENTS

| EP | 0 491 132 A2 | 6/1992 | ........... G06K/11/14 |
| WO | WO 98/29853 | 12/1997 | |

OTHER PUBLICATIONS

International Search Report for application No. PCT/US00/32237, filed Nov. 21, 2000. Search completed Jul. 23, 2001.

Primary Examiner—Steven Saras
Assistant Examiner—Uchendu O. Anyaso

(57) ABSTRACT

A method and apparatus for adapting an acoustic touchscreen controller to the operating frequency requirements of a specific touchscreen are provided. The adaptive controller can either utilize look-up tables to achieve the desired output frequency or the it can use a multi-step process in which it first determines the frequency requirements of the touchscreen, and then adjusts the burst frequency characteristics, the receiver circuit center frequency, or both in accordance with the touchscreen requirements. In one embodiment, the adaptive controller compensates for global frequency mismatch errors. In this embodiment a digital multiplier is used to modify the output of a crystal reference oscillator. The reference oscillator output is used to control the frequency of the signal from the receiving transducers and/or to generate the desired frequency of the tone burst sent to the transmitting transducers. In another embodiment that is intended to compensate for both global and local frequency variations, the adaptive controller uses a digital signal processor. The digital signal processor, based on correction values contained in memory, defines a specific center frequency which preferably varies according to the signal delay, thus taking into account variations caused by localized variations in the acoustic wave reflective array. In yet another embodiment, a non-crystal local oscillator is used to provide the reference signal in the adaptive controller. The use of such an oscillator allows the controller to be miniaturized to a sufficient extent that it can be mounted directly to a touchscreen substrate. A feedback loop is used to compensate for oscillator drift. A discriminator circuit determines the degree of deviation from the desired frequency. The output from the discriminator is used to adjust the frequency of the local oscillator such that it tracks the frequency of the touchscreen.

13 Claims, 12 Drawing Sheets

U.S. PATENT DOCUMENTS

| | | |
|---|---|---|
| 5,162,618 A | 11/1992 | Knowles |
| 5,177,327 A | 1/1993 | Knowles |
| 5,243,148 A | 9/1993 | Knowles |
| 5,260,521 A | 11/1993 | Knowles |
| 5,329,070 A | 7/1994 | Knowles |
| 5,334,805 A | 8/1994 | Knowles et al. |
| 5,380,959 A | 1/1995 | Knowles |
| 5,573,077 A | 11/1996 | Knowles |
| 5,591,945 A | 1/1997 | Kent |
| 5,708,461 A | 1/1998 | Kent |
| 5,739,479 A | 4/1998 | Davis-Cannon et al. |
| 5,831,600 A | 11/1998 | Inoue et al. |
| 5,854,450 A | 12/1998 | Kent ................ 178/18.04 |

ADAPTIVE FREQUENCY TOUCHSCREEN CONTROLLER USING INTERMEDIATE-FREQUENCY SIGNAL PROCESSING

TECHNICAL FIELD OF THE INVENTION

The present invention relates generally to touchscreens and, more particularly, to a method and apparatus for adapting the frequency of a touchscreen controller in order to match the controller to the particular operating characteristics of a specific touchscreen.

BACKGROUND OF THE INVENTION

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become common place in a variety of different applications including, for example, point-of-sale systems, information kiosks, automated teller machines (i.e., ATMs), data entry systems, etc.

In one specific type of touchscreen, an acoustic touchscreen, acoustic or ultrasonic waves are generated and directionally propagated across the touchscreen surface utilizing the phenomena of surface acoustic waves, e.g., Rayleigh waves, Love waves, or other waves. Typically each axis of the touch panel includes a single transmitter transducer, a single receiver transducer, and a pair of reflective arrays. The transmitting transducers and the receiving transducers are coupled to a controller, the controller generating the drive signals that are applied to the transmitting transducers and amplifying, conditioning and responding to the signals from the receiving transducers. The acoustic wave produced by each transmitter transducer is reflected by the reflective array located near the touchscreen edge. The array reflects the acoustic wave, typically at a right angle along the entire length of the array, producing a surface acoustic wave pattern that propagates across the active area of the touchscreen. The propagated surface acoustic wave has a substantially linear wavefront with a uniform amplitude. The opposing reflective array reflects the surface propagated acoustic wave to a receiving transducer. By monitoring the arrival time and the amplitude of the propagated wave along each axis of the touchscreen, the location of any wave attenuation point on the touchscreen surface can be determined. Attenuation can be caused by touching the screen with a finger or stylus or other media.

Typically a manufacturer of touchscreen systems produces or purchases controllers with a predetermined oscillation frequency that is within a well defined frequency range, the reference frequency being provided by a crystal oscillator. Then during the manufacturing process the characteristic frequency of each touchscreen is determined and adjusted, as necessary, to ensure that there is sufficient match between the touchscreen and the oscillation frequency of the controller.

Let us more carefully define the characteristic frequency of a touchscreen. Acoustic touchscreens of the types of interest here have the property of being a narrow band pass filter. The center frequency of the narrow band is determined by the spacing of the reflectors and by the velocity of the acoustic waves. As a consequence, a brief burst applied to a transmitter transducer appears, after a time delay corresponding to an acoustic wave traveling the shortest possible path to a receiving transducer, in the form of a long drawn-out wave train. While the frequency spectrum of the input burst is typically quite wide due to the short duration of the burst, the spectrum of the output wave train is ideally very narrow and sharply peaked at a specific frequency. This specific frequency is referred to as the touchscreen's characteristic frequency. It is desired that the touch system's operating frequency match the touchscreen's characteristic frequency.

In principle, an ideal touchscreen has a single characteristic frequency. In practice, manufacturing variations can result in a plurality or range of characteristic frequencies. Current practice involves making a sufficient investment in the touchscreen manufacturing process so that there is effectively only a single characteristic frequency of the touchscreen and that this characteristic frequency matches that determined by the controller's reference oscillator. In order to achieve the desired control over the touchscreen manufacturing process, precise coordination of array design, careful monitoring of the supply chains of incoming materials, and prompt electronic testing of reflective arrays are required. In addition, when an unanticipated change or variation is discovered, rapid corrective action is necessary. For example, the array may need to be redesigned and a new printing mask fabricated. The degree of coordination, monitoring, and testing required to maintain control of the touchscreen characteristic frequency adds cost to the process and limits production to facilities with a workforce well trained in the intricacies of acoustic touchscreen manufacture. This is an important limitation of present acoustic touchscreen technology.

In general, frequency mismatch can be categorized as being either global or localized in nature. In cases in which the frequency mismatch is global, the source of mismatch affects the entire touchscreen. For example, if the reference oscillator of a controller drifts, or alternatively, if the glass substrate has an unexpected acoustic velocity (e.g., due to the glass substrate being fabricated by a different glass supplier), the frequency match between the touchscreen and the controller is compromised regardless of the location of interest on the touchscreen. In contrast, in cases in which the frequency mismatch is localized, only a specific region of the touchscreen may exhibit mismatch with the controller.

Both global and localized frequency mismatch can be caused by a variety of sources. Although some sources of mismatch can be overcome through sufficient quality control, often the cost of such control can be quite high. For example, variations in the touchscreen glass substrate can vary the acoustic wave velocity thereby causing global frequency mismatch, controlling the glass supply chain and manufacturing process sufficiently to ensure that the acoustic wave velocity of all substrates fall within a narrow range may be economically unfeasible. Controlling the glass supply chain and manufacturing process is even more problematic in those instances in which acoustic reflective arrays are printed directly onto the faceplate of a cathode ray tube (i.e., CRT). Specific glass characteristics that are difficult to control to the degree necessary to avoid global frequency mismatch include the chemical composition and the thermal history (e.g., annealing time and temperature, etc.).

Another source of frequency mismatch is due to undesired variations within the reflective array printed on the touchscreen substrate. These variations may, for example, result from the array mask being distorted during the screen printing process. Print mask distortion is especially problematic if the array is to be printed directly onto a CRT faceplate. Other array printing techniques such as pad printing are also subject to the registration errors introduced during the printing process that can lead to further frequency mismatch. Another source of frequency mismatch can arise from improperly correcting for the spherical geometric effects of a non-planar substrate surface.

What is needed in the art is a method and apparatus for adapting the oscillation frequency of a controller to the operating frequency requirements of specific touchscreens. The present invention provides such a method and apparatus.

SUMMARY OF THE INVENTION

The present invention provides a method and apparatus for adapting the frequency of a controller to the operating frequency requirements of a specific touchscreen substrate, wherein the touchscreen substrate includes reflective arrays. More specifically, the controller is adapted such that it outputs a burst signal to the touchscreen's transmitting transducers or conditions the signal from the touchscreen's receiving transducers, thereby accommodating the particular operating frequency characteristics of the touchscreen's substrate.

In one application of the invention, the characteristic frequency or frequencies of a specific touchscreen is first determined. The frequency of the controller that is intended for use with this substrate is then adjusted to match the substrate's measured characteristic frequency or frequencies thus allowing the two components to be paired as a matched set. In an alternate application, a touchscreen substrate is paired with a controller prior to matching the operating frequencies of the two components. After pairing, the system is initialized during which time the touchscreen substrate's frequency characteristics are determined. The frequency characteristics of the controller are then adjusted to match those of the substrate. If desired, the system can periodically retest the frequency characteristics of the substrate and readjust the controller's output as deemed necessary.

In one embodiment of the invention that is primarily intended to compensate for global frequency mismatch errors, the adaptive controller of the invention uses analog signal processing and a crystal reference oscillator. A digital multiplier is used to modify the output of the reference oscillator to generate the desired frequency of the tone burst sent to the transmitting transducers and/or to vary the frequency used by the receive circuit to produce the baseband signal. The burst length is determined by a burst circuit. The desired operating frequency is determined by a mixer containing circuit that compares the output of the digital multiplier to the suitably conditioned output signal of the receiving transducer. The output from the mixer containing circuit is used to determine the desired operating frequency.

In another embodiment of the invention that is intended to compensate for both global and local frequency variations, the adaptive controller of the invention uses digital signal processing and a crystal reference oscillator. In this embodiment a digital signal processor receives the digitized, filtered outputs from a pair of mixers. The inputs to the mixers are a pair of reference signals, one of which has been phase shifted by 90 degrees, and suitably filtered and amplified receiver transducer RF signals. This embodiment is an example of the use of a phase-sensitive controller in which the complete mathematical content, e.g., phase and amplitude, of the received signal is digitized. With complete digitized information available for processing by digital signal processor algorithms, software tunable frequency filters can be applied to the received signal. The digital signal processor, based on correction values contained in memory, applies a frequency filter with a specific center frequency which preferably varies according to the delay time since the last burst was transmitted. Thus the system can adapt to variations caused by localized variations in the acoustic wave reflective array.

In yet another embodiment of the invention, a non-crystal local oscillator is used to provide the reference signal in the adaptive controller. The use of such an oscillator allows the controller to be miniaturized to a sufficient extent to allow it to be mounted directly to a touchscreen substrate. A feedback loop is used to compensate for the drift of the oscillator. In this embodiment the conditioned RF signal from the touchscreen receiver transducers is mixed with the output from the local oscillator. The IF output from the mixer is passed to a discriminator circuit that generates a voltage, the sign of which depends on whether the frequency is higher or lower than desired and the amplitude of which depends on the degree of deviation from the desired frequency. The output from the discriminator is used to adjust the frequency of the local oscillator such that it tracks the frequency of the touchscreen. To achieve the desired burst frequency, the stabilized output from the local oscillator is mixed with the output from an IF oscillator.

In yet another embodiment of the invention, the burst is sufficiently broadband so that it is sufficient to adjust only the center frequency of the circuitry processing the receive circuit by means of a voltage controlled, variable frequency bandpass filter.

A further understanding of the nature and advantages of the present invention may be realized by reference to the remaining portions of the specification and the drawings.

DESCRIPTION OF THE SPECIFIC EMBODIMENTS

Figure 1:
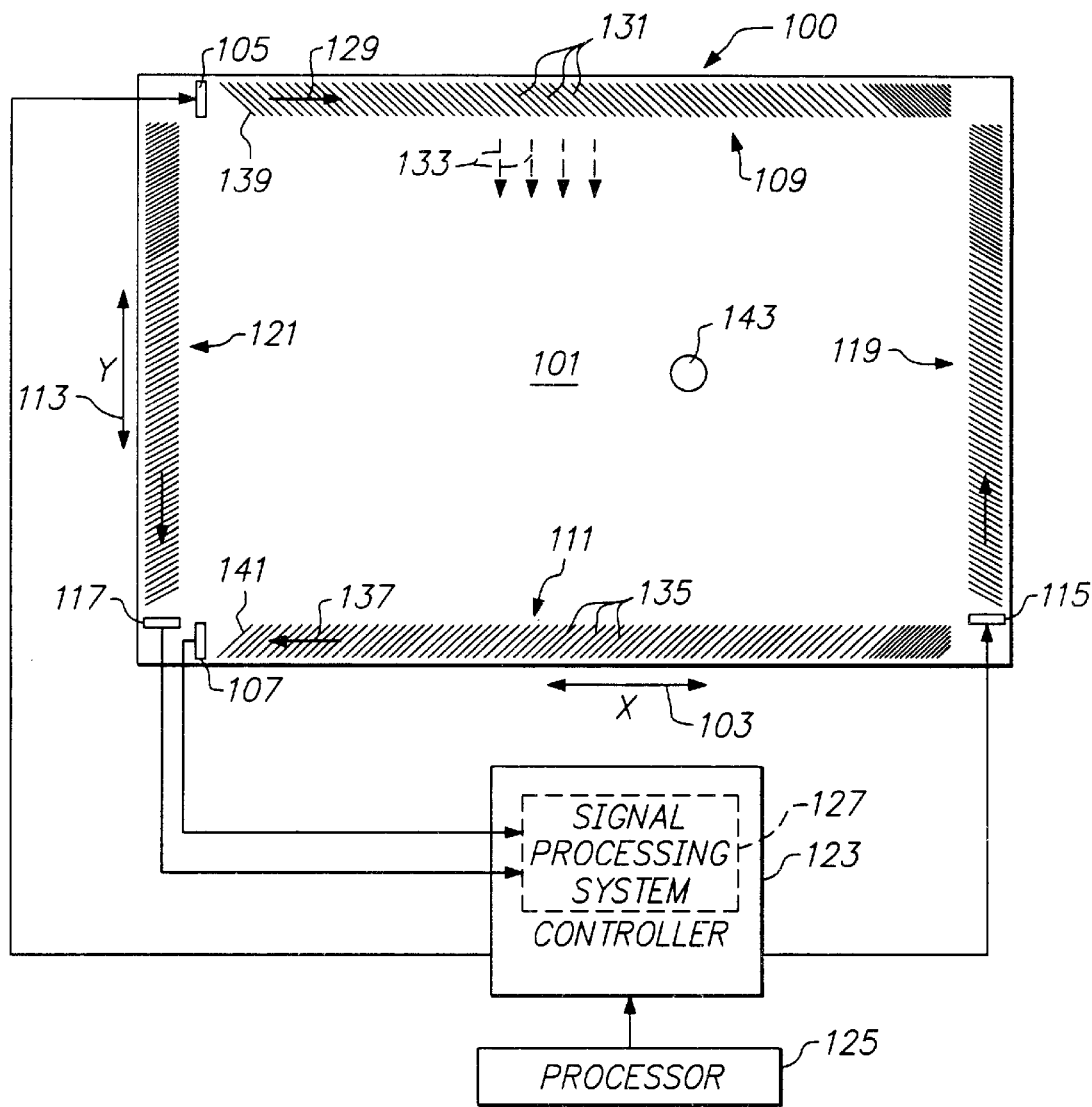
FIG. 1 is an illustration of an acoustic touchscreen according to the prior art.

FIG. 1 is an illustration of a touchscreen 100 utilizing surface acoustic waves according to the prior art. This type of touchscreen is suitable for use with a cathode ray tube (i.e., CRT) display, a liquid crystal display (i.e., LCD), or other display type. A common type of acoustic touchscreen employs Rayleigh waves, a term which, as used herein, subsumes quasi-Rayleigh waves. Illustrative disclosures relating to Rayleigh wave touchscreens include Adler, U.S. Pat. Nos. 4,642,423; 4,645,870; 4,700,176; 4,746,914; 4,791,416; and Re 33,151; Adler et al., U.S. Pat. Nos. 4,825,212; 4,859,996; and 4,880,665; Brenner et al., U.S. Pat. No. 4,644,100; Davis-Cannon et al., U.S. Pat. No. 5,739,479; and Kent, U.S. Pat. Nos. 5,708,461 and 5,854,450. Acoustic touchscreens employing other types of acoustic waves such as Lamb or shear waves, or combinations of different types of acoustic waves (including combinations involving Rayleigh waves) are also known, illustrative disclosures including Kent, U.S. Pat. Nos. 5,591,945 and 5,854,450; Knowles, U.S. Pat. Nos. 5,072,427; 5,162,618; 5,177,327; 5,243,148; 5,329,070; and 5,573,077; and Knowles et al., U.S. Pat. No. 5,260,521. The documents cited in this paragraph are incorporated herein by reference for all purposes. Surface acoustic wave touchscreens will be discussed briefly herein, thus allowing a fuller understanding of the present invention.

Touchscreen 100 includes a substrate 101 suitable for propagating surface acoustic waves, e.g., Rayleigh waves, Love waves, and other waves sensitive to a touch on the surface. To determine touch coordinates along an x-axis 103, a system is used that includes a transmitter transducer 105, a receiver transducer 107, and a pair of associated reflective arrays 109 and 111, respectively. A similar system is used to determine coordinates along a y-axis 113 which includes a transmitter transducer 115, a receiver transducer 117, and associated reflective arrays 119 and 121. Transmitter transducers 105 and 115 are coupled to a controller 123, typically under the control of a processor 125. Receiver transducers 107 and 117 are also coupled to controller 123 which includes a signal processing system 127. Although a signal may be simultaneously applied to transducers 105 and 115, preferably the signals to the transducers are sequential, thus reducing interference and cross-talk between the two coordinate sensing channels. The sequential sensing approach also reduces circuit complexity as many of the necessary circuits can be alternately used in the two sensing channels thereby eliminating the need for unnecessary circuit duplication. In order to further reduce circuit complexity, typically the prior art sends the same frequency burst to both transmitter transducers 105 and 115.

One of the sensing channels will now be described in further detail. The description of this channel is equally applicable to the second sensing channel. In order to determine a touch coordinate along x-axis 103 for substrate 101, transmitter transducer 105 sends a burst acoustic wave (e.g., an approximately 5 microsecond burst) along a path 129. Due to the relatively wide bandwidth associated with this burst acoustic wave, the frequency is not very well defined. Reflective array 109 includes a plurality of reflective elements 131 that are disposed along path 129, each element 131 oriented at an approximately 45 degree angle to path 129. Elements 131 are designed to extract a plurality of wave components 133 from the acoustic wave traveling along path 129, transmitting components 133 along the surface of substrate 101, preferably in a direction parallel to y-axis 113. The pattern design for array 109 is such that the individual components reflected by individual reflectors 131 coherently add together, thus creating a substantially linear wavefront with uniform amplitude. Wave components 133 are recombined by a plurality of reflective elements 135 within array 111, elements 135 directing the wave components along a path 137 to receiver transducer 107. Individual array elements 135 are disposed along path 137 and oriented at an approximately 45 degree angle to the path. Due to the time delay imposed on the sound wave emitted by transducer 105 by the speed of sound associated with substrate 101, rather than a short burst, receiver transducer 107 receives a relatively long duration signal (e.g., approximately 150 microseconds duration).

Figure 2:
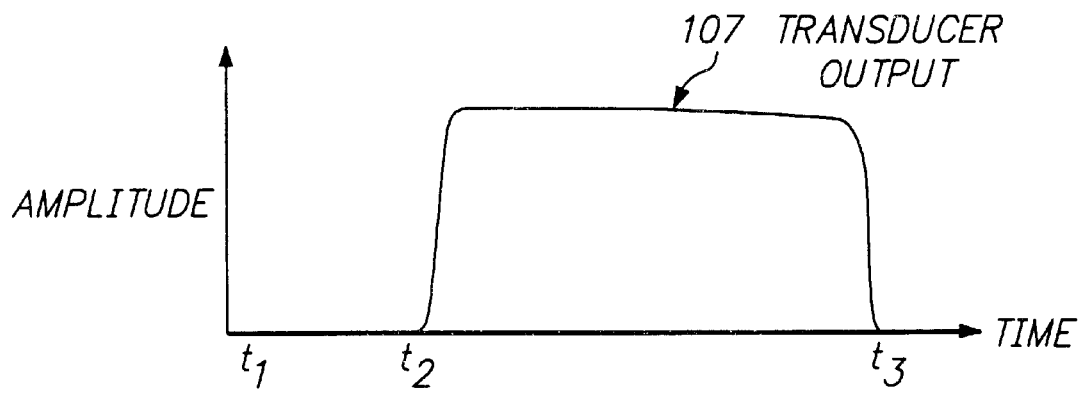
FIG. 2 is a graph illustrating a waveform, i.e., signal amplitude vs. time, as received by a surface acoustic wave transducer for one axis of a touchscreen according to the prior art.

Receiver transducer 107 converts the waveform information received along path 137 into an electrical signal. This electrical signal is analyzed, for example by performing an arrival time analysis of the received wave. FIG. 2 is a graph illustrating a typical time analysis of such a wave. As shown, the amplitude, i.e., the envelop of RF signal, of the received wave is plotted against time. At a time $t_1$, a signal is provided by source 123 to transducer 105. Time $t_2$ is the beginning of the wave received by transducer 107. The time delay between $t_1$ and $t_2$ is due to the time delay between the wave launched by transducer 105 reaching a first element 139 of array 109, traveling across the surface of panel 101, and being reflected by a first element 141 of array 111. At time $t_3$, the last of the wave reaches transducer 107. Due to the spacing and design of the array elements, the amplitude of the curve between times $t_2$ and $t_3$ is relatively constant, assuming that the wave is unperturbed.

Figure 3:
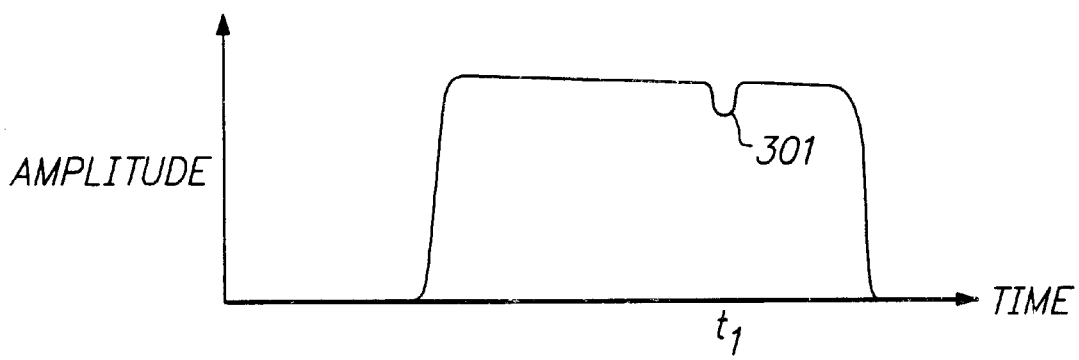
FIG. 3 is a graph of the waveform shown in FIG. 2 in which the waveform has been perturbed by a touch on the touchscreen.
Figure 4:
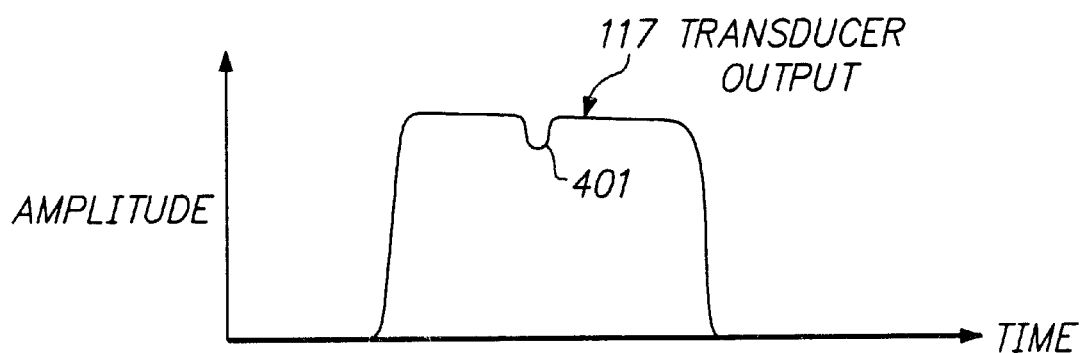
FIG. 4 is a graph of a perturbed waveform traveling across the surface of the touchscreen in an orthogonal direction to the waveform illustrated in FIGS. 2 and 3.

FIG. 3 is a graph of a second waveform received by transducer 107. As shown, the amplitude of the waveform has a dip 301 at a time $t_t$. Dip 301 is due to acoustic wave attenuation at a location 143 on substrate 101. By analyzing the time delay between $t_1$ and $t_t$, signal processor 127 in conjunction with processor 125 is able to calculate the x-coordinate of touch 143. Similarly, processors 125 and 127 in conjunction with source 123, transducers 115 and 117, and reflective arrays 119 and 121, are able to calculate the y-coordinate of touch 143. FIG. 4 is a graph of a waveform received by transducer 117 showing an attenuation dip 401 due to touch 143.

Figure 5:
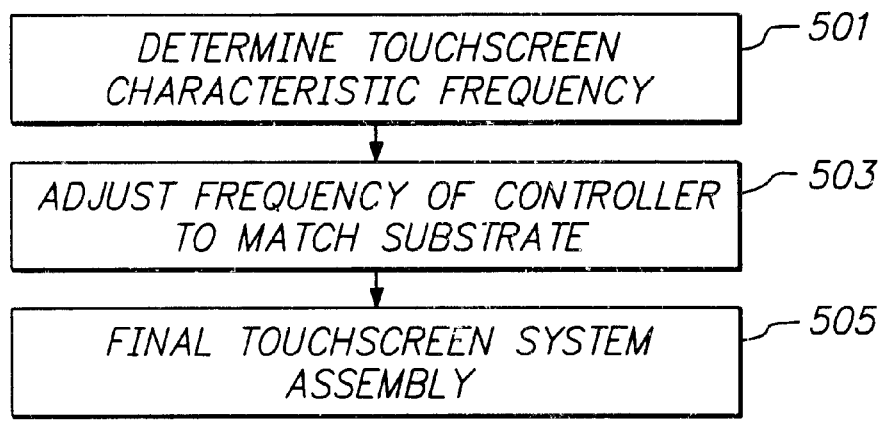
FIG. 5 is a flowchart illustrating one method of using the present invention.
Figure 6:
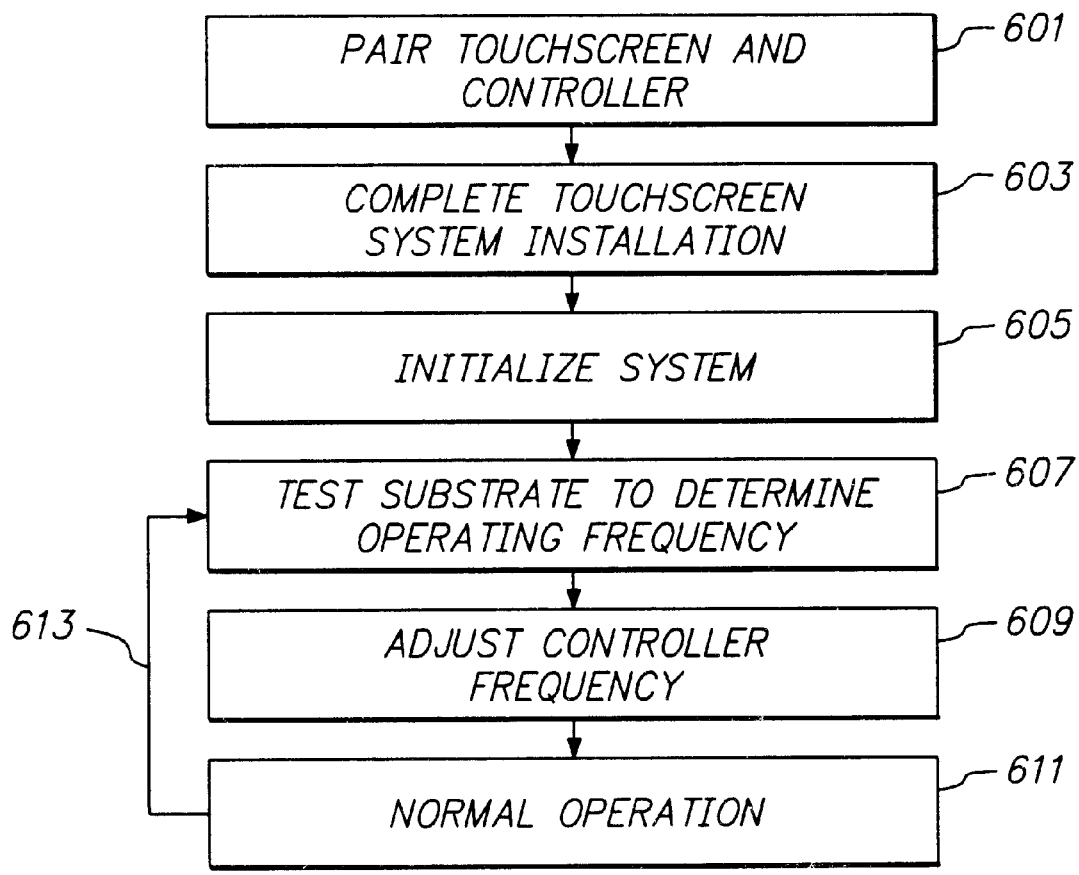
FIG. 6 is a flowchart illustrating an alternate method of using the present invention.

FIGS. 5–6 are flowcharts illustrating the basic methodologies associated with the adaptive controller of the present invention. The method shown in FIG. 5 is best suited for use during the touchscreen system manufacturing process although it can also be employed at the user's location. In step 501 the characteristic frequency or frequencies of a specific touchscreen is determined utilizing any of a variety of well known testing techniques. For example, if the touchscreen is being tested at the manufacturer's site, it can be placed within a testing jig and a sound wave can be launched across the substrate's surface. Once the characteristic frequency or frequencies of the touchscreen is known, the frequency of the controller that is intended for use with this touchscreen is then adjusted to match the measured touchscreen frequency (step 503). Typically the frequency of the controller is adjusted until the desired frequency is obtained. Alternately, the controller can include a look-up table into which controller settings have been recorded along with the resultant output frequency. Preferably the look-up table is specific to a given controller, i.e., each controller has a look-up table that takes into account variations within the individual controllers. Once the operating frequency of the touchscreen is determined, the look-up table of the controller paired with the given touchscreen is used to make the appropriate controller settings. Regardless of which approach is used to adjust the controller, once it has been adapted to match the substrate, the touchscreen system can be assembled (step 505).

In the method illustrated in FIG. 6, a controller is paired with a touchscreen prior to making any attempt to match the frequencies of the two (step 601). The touchscreen system installation is then completed (step 603) and system initialization begins (step 605). During system initialization, the touchscreen is tested to determine its characteristic frequency or frequencies (step 607). This testing step preferably utilizes the normal touchscreen transmitter/receiver transducers (e.g., 105/107 and/or 115/117) operating in a single burst test mode. Alternately, a dedicated pair of transducers can be used. Once the characteristic frequency or frequencies of the substrate has been determined, the frequency of the controller is adjusted (step 609), making the system ready for normal operation (step 611).

In a variation of the method illustrated in FIG. 6 and described above, the system is designed to periodically adjust the controller during touch operation, thereby ensuring optimum frequency matching. In contrast to the previously described system, however, a periodic test sequence is performed in which the touchscreen is retested and the controller readjusted (step 613). Readjustrment of the controller can be set to occur every time the system enters a power-up sequence or after a predetermined period of time has lapsed. Periodic controller adjustment is typically desired when either the touchscreen substrate or the controller is prone to temperature related fluctuations. For example, if a polymer substrate is used, the acoustic wave velocity of the substrate is likely to change with ambient temperature changes. Similarly, if the controller does not use a crystal oscillator, it may have a frequency reference subject to drift, thus requiring active controller adaptation.

A readily apparent benefit of the adaptive controller described above occurs whenever a touchscreen system fails at the user's location due to either the failure of the touchscreen substrate, for example due to vandalism, or the failure of the controller. Due to the frequency adaptive qualities of the controller, a new touchscreen or a new controller can easily be installed on-site, a preferable solution to either sending the entire touchscreen system back to the manufacturer for repair or sending a matched touchscreen/controller to the user's location for on-site replacement. For example, if the touchscreen of an existing touchscreen system requires replacement, the old controller can perform a new initialization test in which the characteristic frequency or frequencies of the new touchscreen is determined and the frequency of the controller is reset to match the new characteristic frequency or frequencies. Alternately, the identification code of the new touchscreen can be used to set the controller's frequency using the look-up table described above. Similarly if a new controller is required at the user's site, it can either be matched to the existing touchscreen through initialization testing or it can be set using the look-up table approach and the old touchscreen's identification code. In the latter approach the controller can either be set at the manufacturer's location or the user's location.

Figure 7:
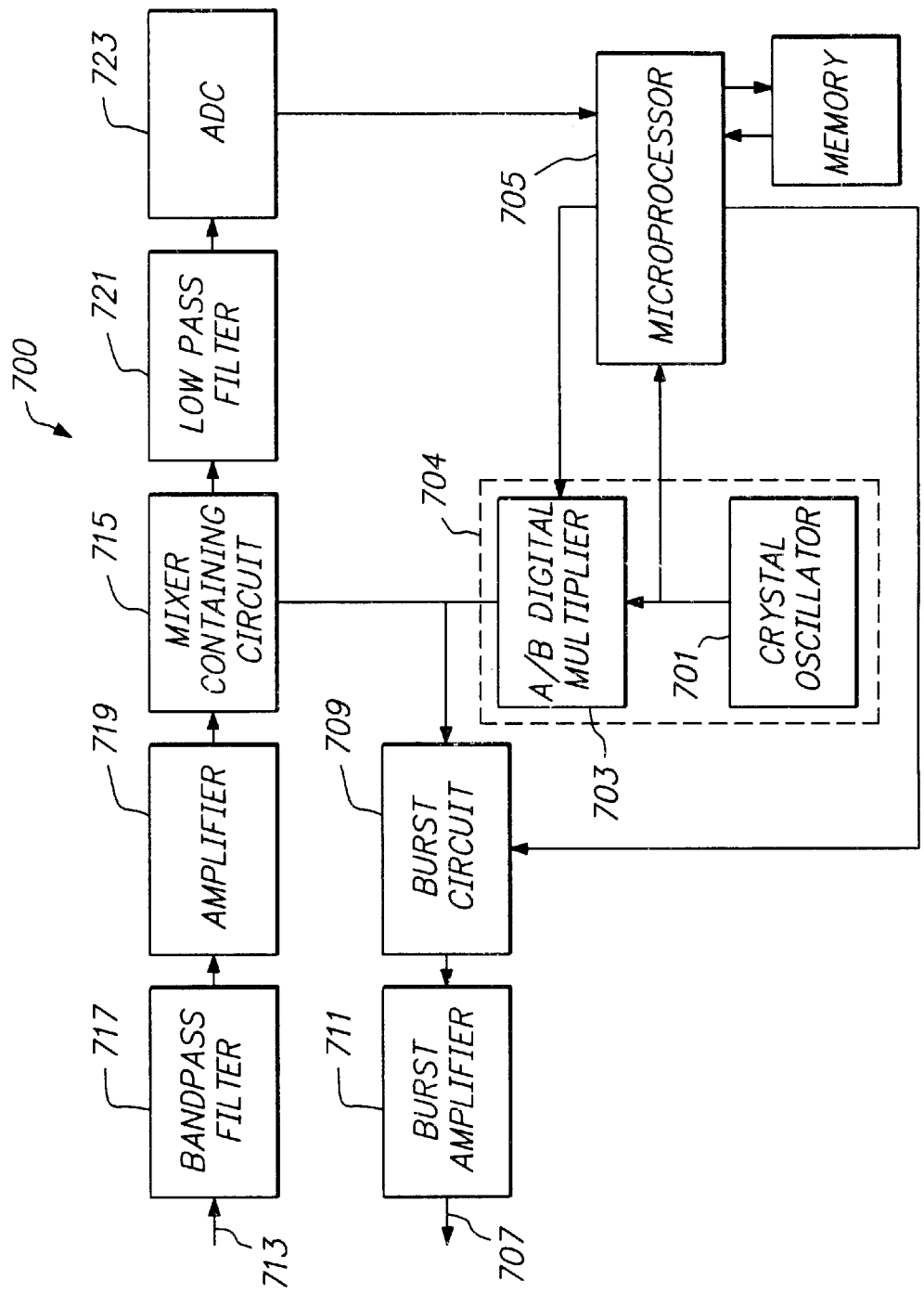
FIG. 7 schematically illustrates an adaptive controller according to the present invention to correct for global variations.

There are a number of embodiments of the present invention, each offering the ability to adapt the frequency of the controller to the requirements of the touchscreen. These embodiments differ in the type of frequency mismatch that the adaptive controller corrects. The embodiment illustrated in FIG. 7 is intended for use in systems that suffer from 'global' frequency mismatch errors, i.e., errors that uniformly affect the degree of frequency compatibility between a controller and a touchscreen. For example, the acoustic wave velocity of a piece of glass will typically vary depending upon its exact composition. Thus as the composition varies between glass batches or between glass vendors, and assuming other frequency affecting factors are sufficiently controlled, the error introduced by the compositional variation will uniformly affect the characteristic frequency of the entire touchscreen due to batch to batch variations in acoustic wave velocity. In a specific example, during the touchscreen manufacturing process a glass tempering step is often required. Depending upon the time and temperature characteristics of the glass tempering step, the characteristic frequency may vary between individual touchscreens.

In touchscreens suffering from non-time varying global frequency mismatch errors (e.g., glass composition variations), preferably the adaptive controller of the present invention goes through a single adaptive frequency algorithm. In this scenario multiple or continuing frequency adaptations are not required as the mismatch between the controller and the touchscreen does not vary with time. Rather the intent of this embodiment is to allow a randomly selected touchscreen and a randomly selected controller (i.e., a non-paired touchscreen/controller set) to be successfully paired during final system assembly or during system repair. Thus this adaptive frequency algorithm is preferably executed during the initial power-up sequence of the paired touchscreen/controller.

The embodiment of the adaptive controller illustrated in FIG. 7 uses analog signal processing. It is understood, however, that digital signal processing could also be used in this embodiment. Within controller 700 is a crystal oscillator 701 oscillating at a frequency close to the desired frequency. The output from this reference oscillator 701 is fed into a digital multiplier 703 (also referred to as a digital divider) as well as a microprocessor 705 within controller 700. Digital multiplier 703 mathematically modifies the output from the crystal oscillator (e.g., by multiplying the crystal oscillator frequency by a rational number A/B) to generate the desired frequency based upon the commands sent to it from microprocessor 705. Thus digital multiplier 703 in conjunction with crystal oscillator 701 forms a master oscillator 704 for the analog system associated with the touchscreen.

The output from digital multiplier 703 is used to generate the tone burst that is output along line 707 to the transmitter transducers (e.g., transducers 105 and 115 of FIG. 1) of the touchscreen. The tone burst is at the frequency output by multiplier 703 with a burst length determined by a burst circuit 709 coupled to microprocessor 705. Prior to the tone burst being communicated to a transmitter transducer, it is typically conditioned and amplified by a burst amplifier 711.

In order to determine the desired operating frequency, the output from a receiver transducer (e.g., 107 and 117 of FIG. 1) is sent along a line 713 to a mixer containing circuit 715. Preferably the transducer output first passes through a bandpass filter 717 and a RF amplifier 719. Bandpass filter 717, typically a fixed broadband filter, is primarily used as a noise suppression circuit, conditioning the RF input. RF amplifier 719 amplifies the signal to the desired levels. Mixer containing circuit 715 compares the frequency component of the conditioned, amplified signal from the receiver transducer to the output signal from digital multiplier 703, outputting a relatively slowly varying, substantially DC base-band signal. The output from mixer containing circuit 715 is digitized by an A-D converter 723 and fed into microprocessor 705. Optionally, low pass filter 721 provides additional conditioning of the mixer containing circuit output prior to being digitized, however it is typically the mixer containing circuit that provides the limiting narrow band filtering.

As previously noted, item 703 is preferably an A/B digital multipler. It should be understood, however, that in general terms item 703 is simply a frequency modifying circuit and therefore can be comprised of any digital, analog, or mixed digital/analog electronic circuit that modifies the crystal oscillator frequency in response to control signals from microprocessor 705.

Depending upon the application, it may be sufficient to only adapt the burst center frequency or the receive center frequency. In those cases in which it is sufficient to only adjust the burst center frequency, circuit 715 does not require input from the digital multipler 703. Accordingly it can be replaced with a more standard detector element such as those commonly found in present controllers. In those cases in which it is sufficient to only adjust the receive center frequency, the coupling between digital multiplier 703 and burst circuit 709 is no longer required.

Figure 8:
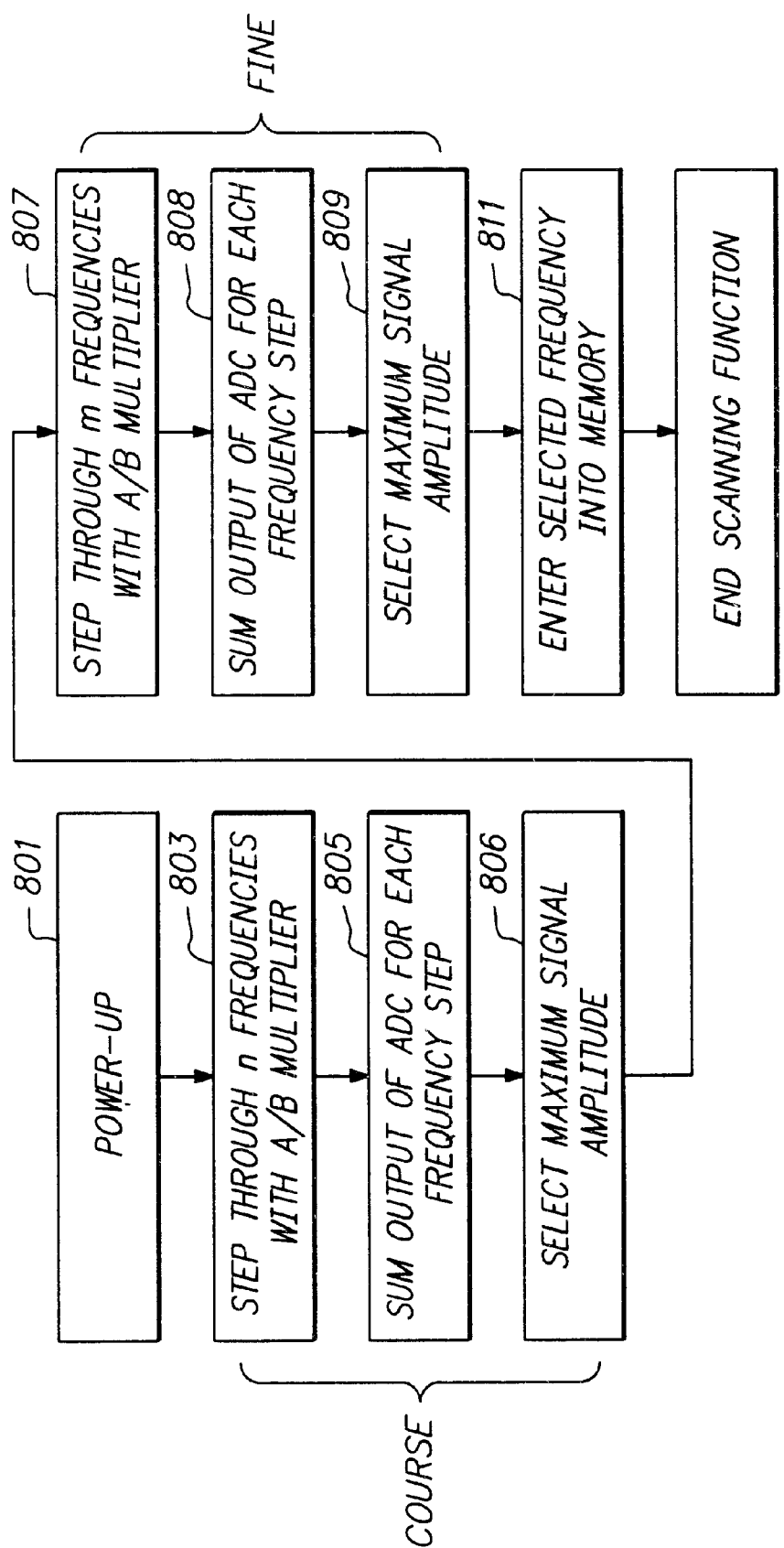
FIG. 8 is a flow chart illustrating the technique used to tune the frequency of the digital multiplier shown in FIG. 7.

FIG. 8 is a flow chart illustrating a technique used to tune the frequency of digital multiplier 703 to match the frequency of the touchscreen to which it is coupled. As previously noted, preferably this embodiment only adapts the frequency of the controller to the touchscreen upon power-up (step 801). Alternately, the system can be designed to perform controller frequency adaptation periodically or only during the first power-up cycle.

After power-up step 801, microprocessor 705 sweeps the output of digital multiplier 703 through a predetermined frequency range (step 803). Preferably the controller performs a course tuning operation first, followed by a fine tuning operation, although it is possible to combine these two operations into a single scan sequence. Therefore during step 803, the predetermined frequency range is scanned using relatively large frequency steps. The output of A-D converter 723 for each frequency step is summed (step 805) and the maximum signal amplitude is selected (step 806), indicating the closest match between the output of the master oscillator and the touchscreen. This scanning/optimization process is then repeated (steps 807–809), scanning the output frequency of the master oscillator around the previously selected frequency using smaller frequency steps. The frequency determined in step 809 to be closest to the touchscreen natural frequency is then entered into memory (step 811), thus ensuring that the output of the master oscillator circuit is maintained at the desired frequency.

Although a two step frequency scanning approach is shown in FIG. 8, it will be understood by those of skill in the art that there are numerous other techniques for determining the desired output frequency. For example, the present invention can also utilize a dithering or successive approximation approach.

The basic algorithm of FIG. 8 does not require the use of an A-D converter sum. In general, steps 805 and 808 represent the collection of any measurable quantity that is sensitive to the degree of frequency mismatch while steps 806 and 809 represent the selection of the measurable quantity corresponding to an acceptably small frequency mismatch. For example, for a given time interval microprocessor 705 can count the number of RF cycles in both the received signal and in the output of digital multiplier 703. The difference between the number of RF cycles provides a measure of frequency mismatch. Other circuits and techniques that accomplish the same purpose are well known by those of skill in the art.

Figure 9:
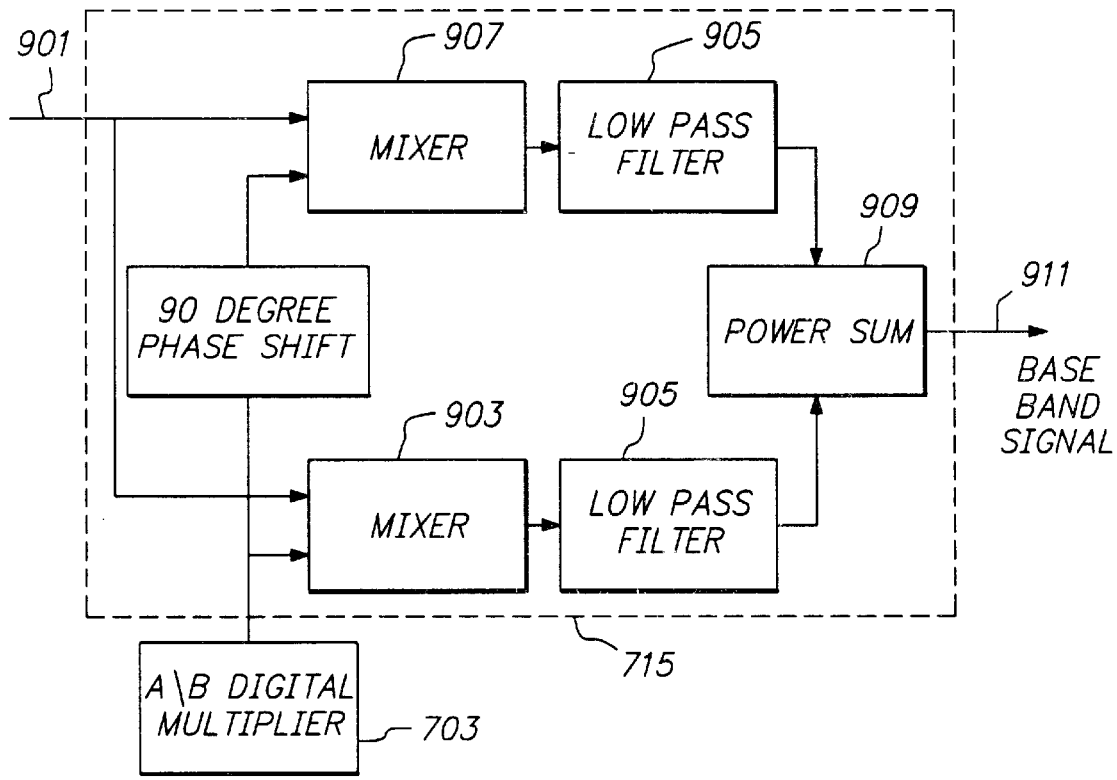
FIG. 9 schematically illustrates the quadrature-sum detector.

FIG. 9 schematically illustrates a quadrature-sum detector as an illustrative example of a mixer containing circuit 715. Conditioned RF input signal 901 is mixed with the oscillator output from digital multiplier 703 in a mixer 903. Mixer 903 outputs the sum frequency and the difference frequency of the two input frequencies. The sum frequency, at approximately 10 MHz, is filtered out using a low pass filter 905. The remaining frequency is close to zero, i.e., base-band. Although the single mixer circuit described above can be used to provide a base-band signal, the output is dependent upon the relative phases of the oscillator output and the RF input signals. In order to achieve relative phase independence, i.e., to avoid beat patterns in the waveforms digitized by A-D converter 723, the quadrature-sum detector has two channels as illustrated in FIG. 9. As shown, a second mixer 907 is used in which the frequency input from the oscillator is phase shifted by 90 degrees. The output of second mixer 907, after passing through another low pass filter 905 is summed with the output from the first channel in a quadrature summing circuit 909. The output of circuit 909 is a base-band signal 911 that is free of beat patterns and is independent of the exact phase of the received signal. Effectively, the quadrature-sum detector of FIG. 9 provides a narrow bandpass filter whose center frequency is adjustable and controlled by the frequency of the output of the digital multiplier 703.

Mixers 903 and 907 shown in FIG. 9 are essential components of the quadrature-sum detector as well as of other possible mixer containing circuits. Mixer 903, for example, combines the signal originating on line 713 and the output of source 704 to obtain a desired output which is a function of both input signals and of the difference between their frequencies. In some cases the full quadrature-sum detector may not be required. For example, if adjustment of the burst frequency is all that is required, the output quantity of interest is the beat of difference between the signals from line 713 and from source 704. Such a difference frequency signal can easily be produced by a diode mixer. Other mixing devices are, of course, known in the art and may be used in modified forms in this invention.

Figure 10:
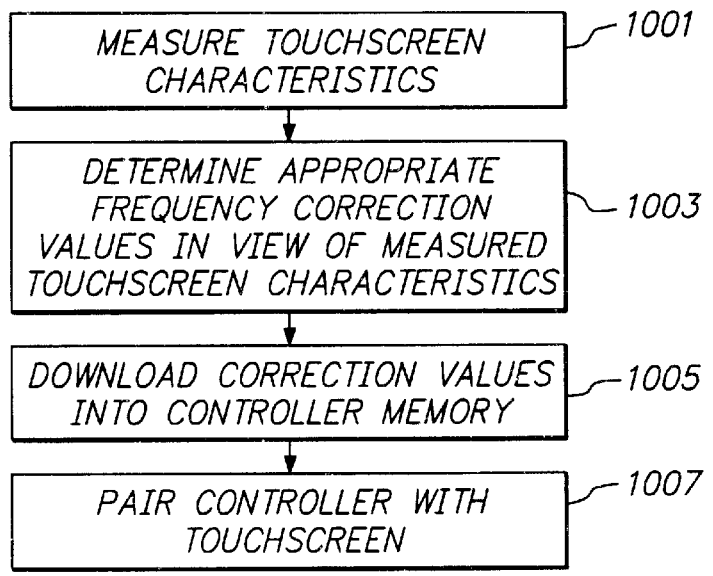
FIG. 10 is a flowchart illustrating the methodology associated with an alternate embodiment of the invention shown in FIG. 11.
Figure 11:
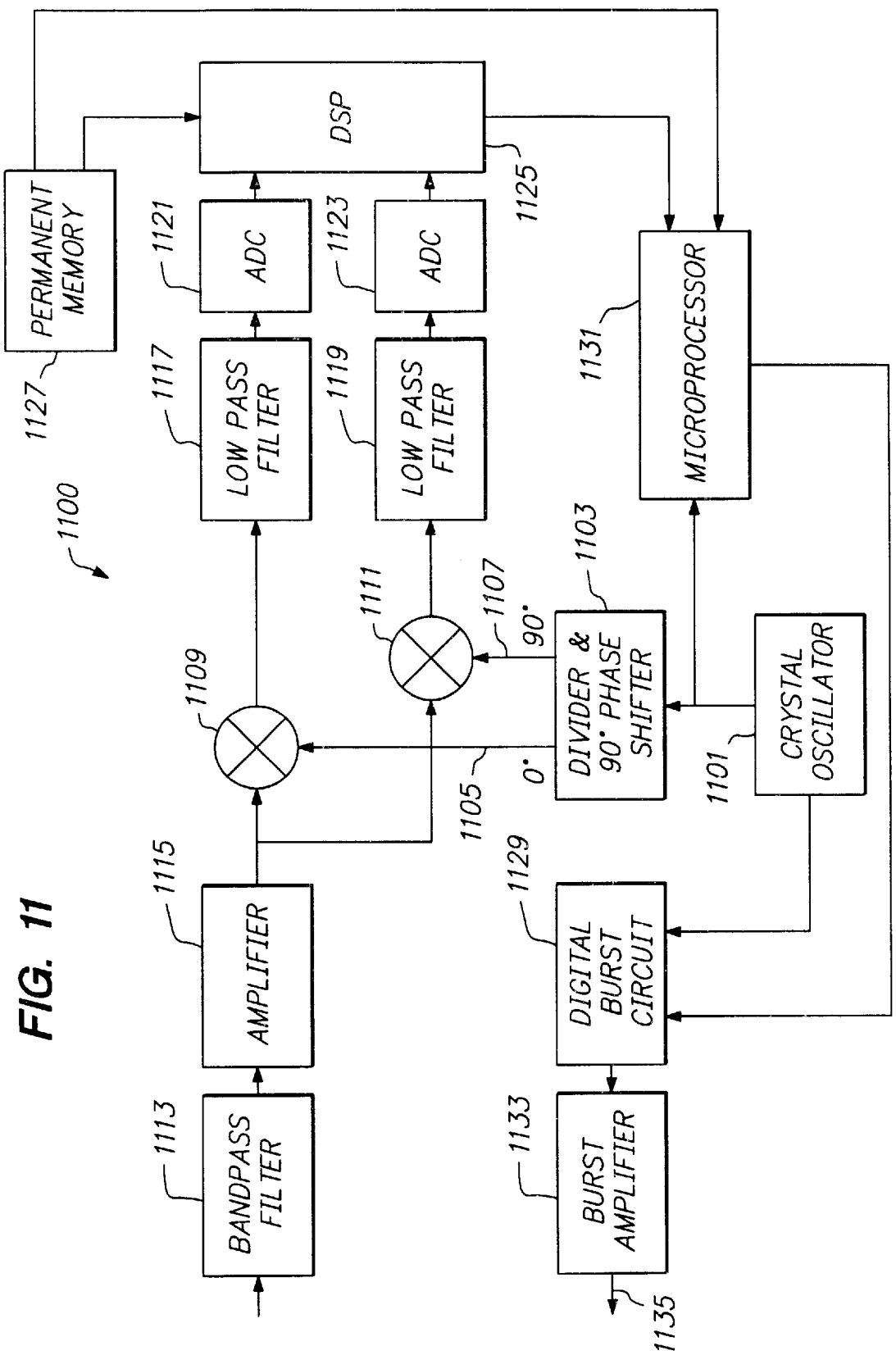
FIG. 11 schematically illustrates an adaptive controller according to the present invention to correct for both global and local variations.
Figure 12:
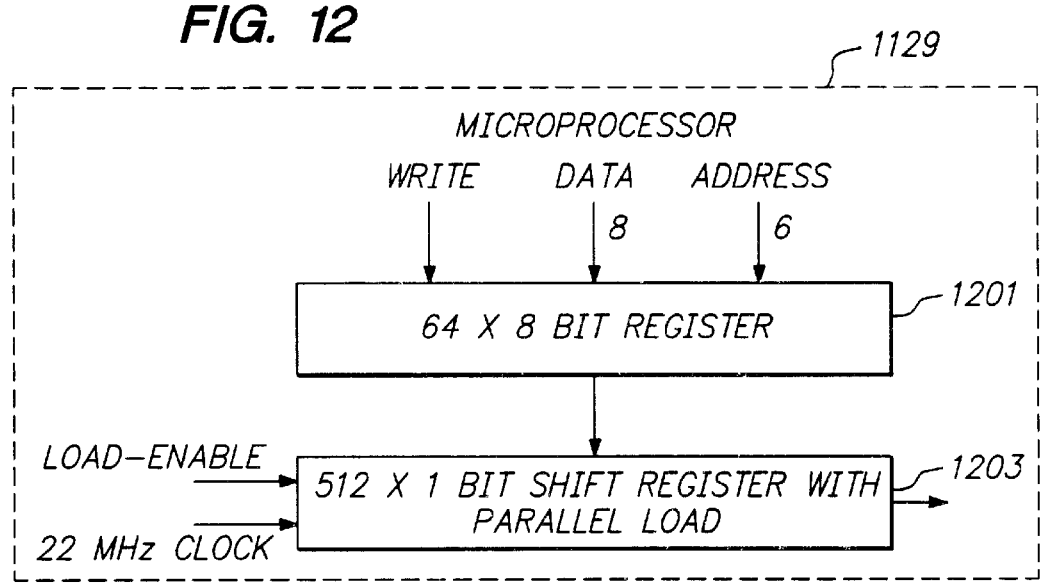
FIG. 12 schematically illustrates a digital burst processor for use with the adaptive controllers shown in FIGS. 11 and 15.

In an alternate embodiment of the invention illustrated in FIGS. 10–12, the controller is programmable in a manner that allows it to adapt to both global variations, i.e., frequency variations that uniformly affect the characteristic frequency of the entire touchscreen, and localized variations, i.e., frequency variations within a localized region of the touchscreen. For illustrative purposes only, this embodiment utilizes digital signal processing. It should be understood, however, that this embodiment could be implemented using analog signal processing as well.

FIG. 10 is a flowchart illustrating the methodology associated with this embodiment of the invention. After fabrication of a touchscreen substrate is complete, including any required array deposition and glass tempering steps, the characteristic frequencies of the touchscreen, including effects of any localized array distortions, are measured (step 1001). Preferably these measurements take place within the manufacturing plant using production floor test equipment. Based on these measurements, a series of frequency correction values are calculated (step 1003), typically as a function of delay time for both the x- and y-coordinates. This set of correction values, specific to an individual touchscreen, are then loaded into the memory of adaptive controller 1100 (step 1005) which is paired with this particular touchscreen (step 1007). It is understood that steps 1005 and 1007 can be reversed in sequence and that touchscreen substrate frequency variation measuring step 1001 can be combined with correction value calculation step 1003.

In a slight variation of the method illustrated in FIG. 10, each touchscreen substrate is provided with an identification code. A table of identification codes and the associated correction values particular to each identification code are then archived, preferably by the manufacturer, seller, or both. Thus if there is ever a need to replace the controller, for example due to breakage, the user need only supply the identification code in order to obtain a new controller which has been preloaded with the necessary correction values.

In the embodiment of the invention illustrated in FIGS. 11 and 12, adaptive controller 1100 uses an oscillator 1101 as a reference. Preferably a stable crystal oscillator is used as the frequency source. The output from oscillator 1101 is sent to a frequency divider/phase shifter 1103 which divides the frequency from a frequency of approximately 22 MHz to the desired frequency of approximately 5.53 MHz and phase shifts a portion of the output by 90 degrees. Unshifted oscillator frequency 1105 and phase shifted oscillator frequency 1107 are then mixed in mixers 1109 and 1111 with suitably filtered and amplified receiver transducer RF signals. As in controller 700, the RF signal from the touchscreen's receiver transducers are filtered with a band pass filter 1113, typically a fixed broadband filter, to remove various noise components and then amplified by amplifier 1115 in order to achieve the desired signal levels.

The output of mixers 1109 and 1111 represent the x- and y-signal amplitudes in the complex plane. Thus by using a pair of mixers and a pair of reference signals, one of which has been phase shifted by 90 degrees, the phase as well as the phase independent magnitude of the complex number can be determined. The output of mixers 1109 and 1111 are passed through a pair of low pass filters 1117 and 1119, respectively, and then digitized with A-D converters 1121 and 1123, respectively. These signals are then sent into a digital signal processor (i.e., DSP) 1125.

DSP 1125 acts as a frequency filter in which both the center frequency and the bandwidth are mathematically controllable. Methods of mathematically controlling DSP 1125 to achieve a controllable bandwidth and center frequency are well known by those of skill in the art and will therefore not be discussed in detail herein. Coupled to DSP 1125 is a memory 1127. Memory 1127 contains the correction values that are obtained by measuring the frequency characteristics of a particular touchscreen (i.e., the touchscreen which is to be paired with controller 1100). Based on the correction values contained in memory 1127, DSP 1125 responds to a specific center frequency. Preferably DSP 1125 responds to a center frequency which varies according to the delay signal, thus taking into account variations caused by localized variations in the acoustic wave reflective array.

Item 1125 of FIG. 11 is a digital signal processor (i.e., DSP) in the general meaning of the word. It represents mathematical or digital processing of the digitized signals from A-D converters 1121 and 1123. DSP 1125 can be implemented in many ways. For example, DSP 1125 may be code executed by microprocessor 1131. Alternately, DSP 1125 may be digital circuitry custom designed for acoustic touchscreen controllers. Furthermore, digital signal processing may take place in a packaged silicon chip of the type often referred to as a "DSP chip" by electronic engineers although it is understood that it is not so limited.

To provide a transmit transducer burst, the output from crystal oscillator 1101 is fed into a digital burst circuit 1129. Burst circuit 1129 manipulates this signal according to the instructions received from microprocessor 1131 which, in turn, receives instructions regarding the desired center frequency from permanent memory 1127. The output of digital burst circuit 1129 is amplified, if needed, by a burst amplifier 1133 prior to being sent to a transmitter transducer along line 1135.

FIG. 12 is a schematic illustration of an example of digital burst circuit 1129. Within burst circuit 1129 is a bit register 1201 (e.g., 64×8 bit register) coupled to microprocessor 1131. Microprocessor 1131 loads the desired bit pattern (i.e., the digital pattern generated by microprocessor 1131 in response to the output from permanent memory 1127) into register 1201, the bit pattern determining the burst center frequency. For each burst, the bit pattern loaded into register 1201 is latched into a shift register 1203 which, to create a burst, is clocked out. It should be understood that different bit patterns can be used to determine the burst center frequency for the x- and y-coordinates of the touchscreen, thus taking into account variations between the two axes. It should be noted that the bit pattern can either be calculated by microprocessor 1131 in response to frequency correction data from memory 1127 or be stored directly in memory 1127.

In another example that can utilize this embodiment of the adaptive controller, the touchscreen uses grating transducers. In a grating transducer, the piezoelectric element is applied to the back surface of the substrate and a grating applied to the front surface of the substrate. The grating is used to coherently diffract the pressure wave created by the piezoelectric element, thus generating an acoustic wave traveling along the surface of the surface. Such grating transducers are found to be most efficient when the operating frequency corresponds to a glass thickness resonance. As the glass thickness resonance frequency of the substrate is dependent upon the thickness of the substrate, preferably the glass thickness is first measured, then the optimal operating frequency is calculated and an appropriate reflective array and grating design for the optimal operating frequency is applied. The adaptive controller of the present invention, e.g., controller 1100, is then used to match the frequency of the controller to the frequency characteristics of the touchscreen. Unlike some applications of this embodiment, however, this example requires that the adaptive controller have the ability to vary the burst frequency as much as 10–20 percent from the frequency of the reference oscillator. Any receive bandpass filter, e.g., filter 1113, needs either to be tunable or to be sufficiently broadband to cover the fall range of variation of touchscreen frequency characteristics.

Figure 13:
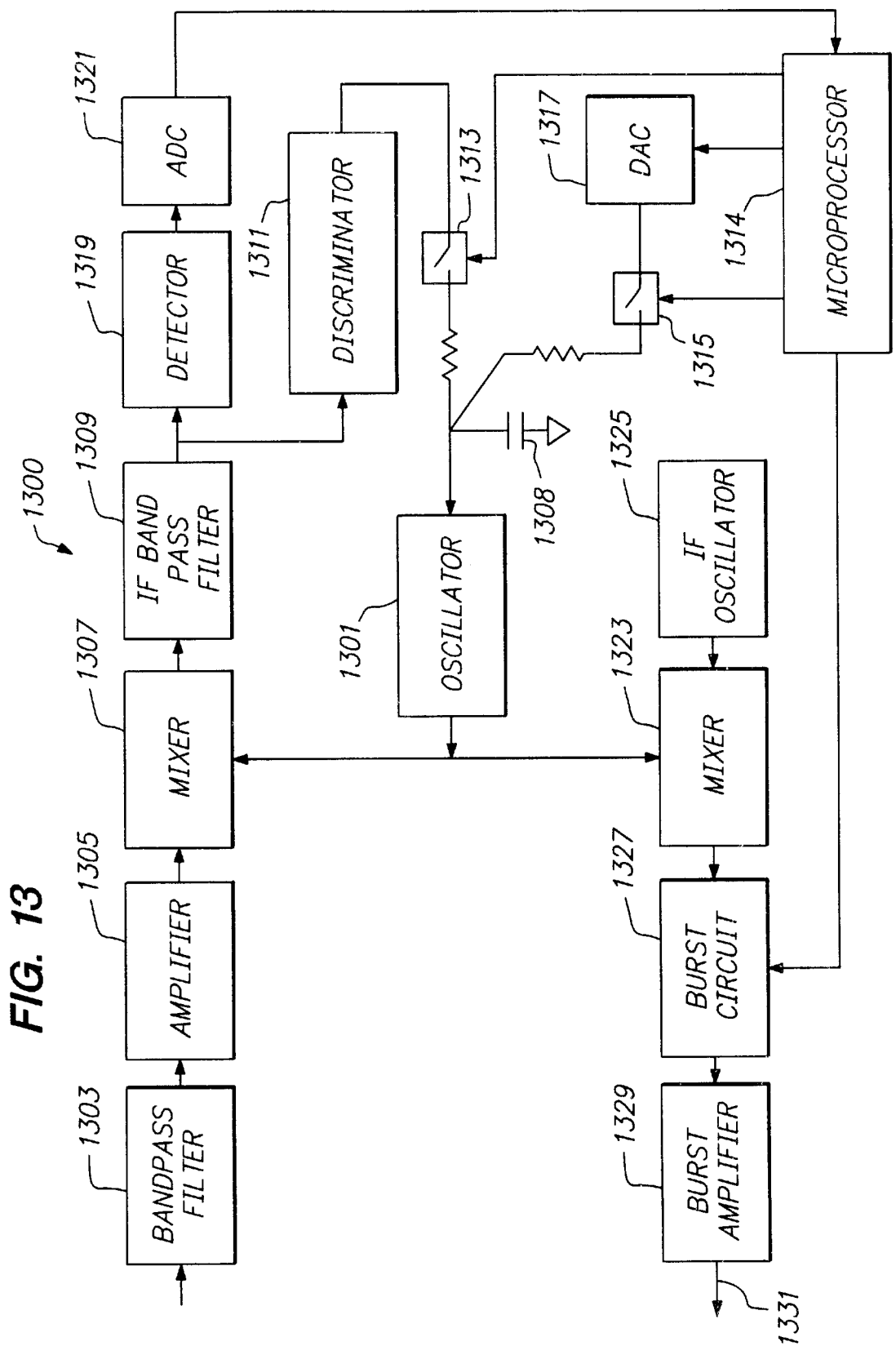
FIG. 13 schematically illustrates a controller that can be mounted directly to a touchscreen substrate.

FIG. 13 schematically illustrates an alternate embodiment of an adaptive controller that can be mounted directly to a touchscreen substrate thus offering both size and cost benefits. In this embodiment the crystal oscillator is replaced with a local oscillator 1301, thus providing the desired size. Local oscillator 1301 may, for example, be constructed entirely from circuit components on a silicon chip. Given the drift of local oscillator 1301 relative to a crystal oscillator, a feedback loop is required to provide the required frequency stability. As a result of the feedback loop, controller 1300 actively, i.e., repeatedly, adapts the oscillator frequency to the desired frequency.

As in the previous embodiments, the RF signal from the touchscreen receiver transducers is first conditioned by passing it through a bandpass filter 1303 and an amplifier 1305. The conditioned RF signal is mixed with the output from local oscillator 1301 in a mixer 1307. Oscillator 1301 is a variable frequency oscillator in which the frequency is controlled by, for example, an input voltage. With an appropriate buffering circuit between capacitor 1308 and oscillator 1301, oscillator 1301 can provide other types of electronic input such as current. In this embodiment the local or reference oscillator is operating at a frequency greater than the touchscreen frequency. For example, for a nominal touchscreen frequency of 5.5 MHz, oscillator 1301 may operate at a frequency of approximately 6 MHz. The output from mixer 1307 will then be at an IF frequency of approximately 500 kHz.

The IF output from mixer 1307 passes through a bandpass filter 1309 prior to entering a discriminator 1311. Discriminator 1311 generates a voltage, the sign of which depends on whether the frequency is higher or lower than the center frequency of discriminator 1311 and the amplitude of which depends on the degree of deviation from the discriminator's center frequency. The output from discriminator 1311 is then used to adjust the frequency of local oscillator 1301, for example using a varactor diode, to reduce the discriminator output voltage to near zero. A switch 1313 coupled to a control processor 1314 is part of a sample and hold circuit that allows local oscillator 1301 to be held at a previously determined frequency between burst/receive cycles. Switch 1313 is closed during receive cycles.

During system power-up, local oscillator 1301 may be off of the desired frequency by a considerable margin, thus preventing the feedback loop from effectively stabilizing the oscillator. As such, controller 1300 preferably includes a ramping feature that gradually adjusts the frequency of local oscillator 1301 until the feedback loop can take over. In one mode of operation, during power-up switch 1313 is open and a second switch 1315 is closed. A digital to analog converter (i.e., a DAC) 1317 under the control of microprocessor 1314 adjusts the frequency of oscillator 1301, increasing (or decreasing) that frequency while observing the output of mixer 1307 with a detector 1319. Detector 1319 is coupled to microprocessor 1314 via an A-D converter 1321. When the output of detector 1319 exceeds a predetermined threshold, thereby indicating that local oscillator 1301 is close to the desired frequency, microprocessor 1314 opens switch 1315 and closes switch 1313, allowing the feedback loop to fine tune the local oscillator frequency. Alternately, both switch 1313 and switch 1315 can be closed during power-up. In this mode once the oscillator frequency is within the bandwidth of bandpass filter 1303, microprocessor 1314 opens switch 1315 thus allowing the feedback loop to fine tune the frequency from this point forward.

In contrast to the previously described embodiments, the frequency of local oscillator 1301 is not adjusted to the desired burst frequency. Rather, the frequency of local oscillator 1301 tracks the frequency of the touchscreen so as to maintain a fixed difference (in this example, 500 kHz) between the two frequencies. Therefore in order to achieve the desired burst frequency, the stabilized output from local oscillator 1301 is mixed in a second mixer 1323 with the output from an IF oscillator 1325. IF oscillator 1325 operates at the same frequency as IF bandpass filter 1309 (i.e., approximately 500 kHz in this example). The output from mixer 1323 is at the desired burst frequency (i.e., approximately 5.5 MHz in this example). A bandpass filter (not shown) may be inserted between mixer 1323 and burst circuit 1327 to pass only the desired sum or difference frequency from mixer 1323. As in the previous embodiments, the length of the tone burst at this frequency is controlled by a burst circuit 1327 coupled to microprocessor 1314. The tone burst is typically amplified to the desired amplitude by a burst amplifier 1329 prior to being output along a line 1331 to one of the touchscreen's transmitter transducers.

The circuit in FIG. 13 is an example of a circuit that shifts the receive signal from the RF frequency to a lower frequency that is not necessarily bass band, e.g., 500 kHz. This is a general technique available to the designer of adaptive frequency controllers. The choice of this lower frequency can be anywhere between the RF frequency and bassband. Its optimal value depends on the details of the specific circuit, noise sources, etc.

Figure 14:
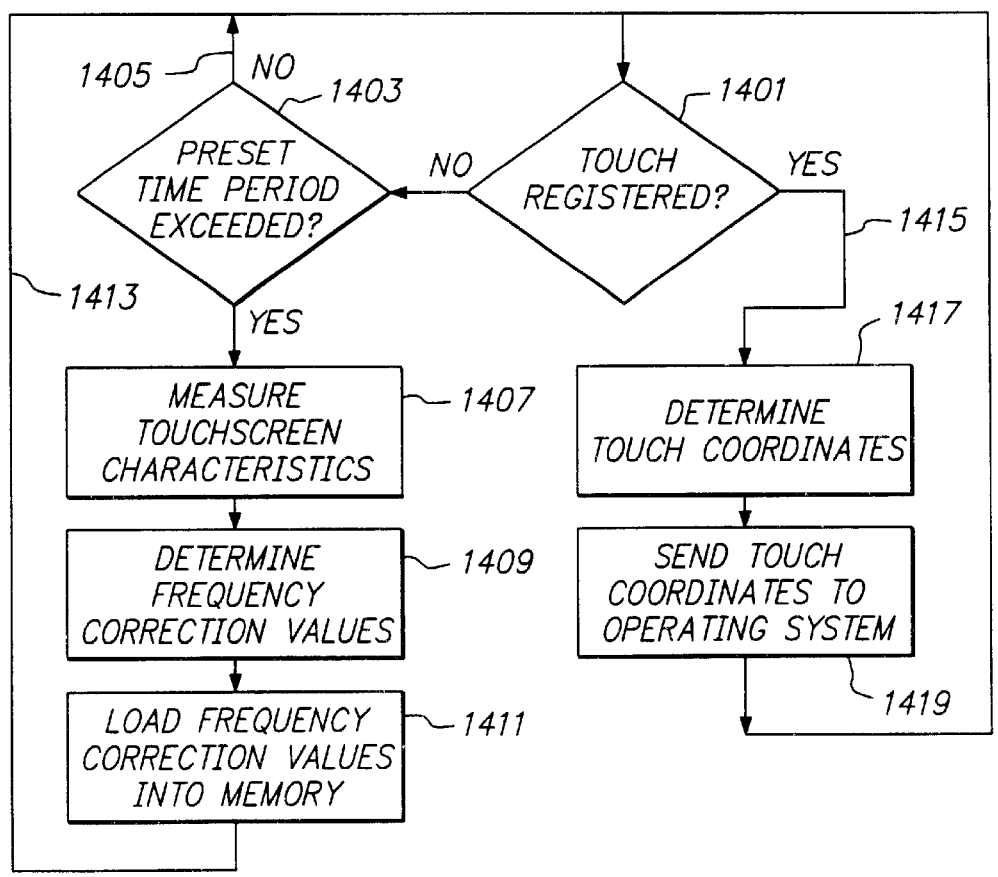
FIG. 14 is a flowchart illustrating the methodology associated with an alternate embodiment of the invention shown in FIG. 15.
Figure 15:
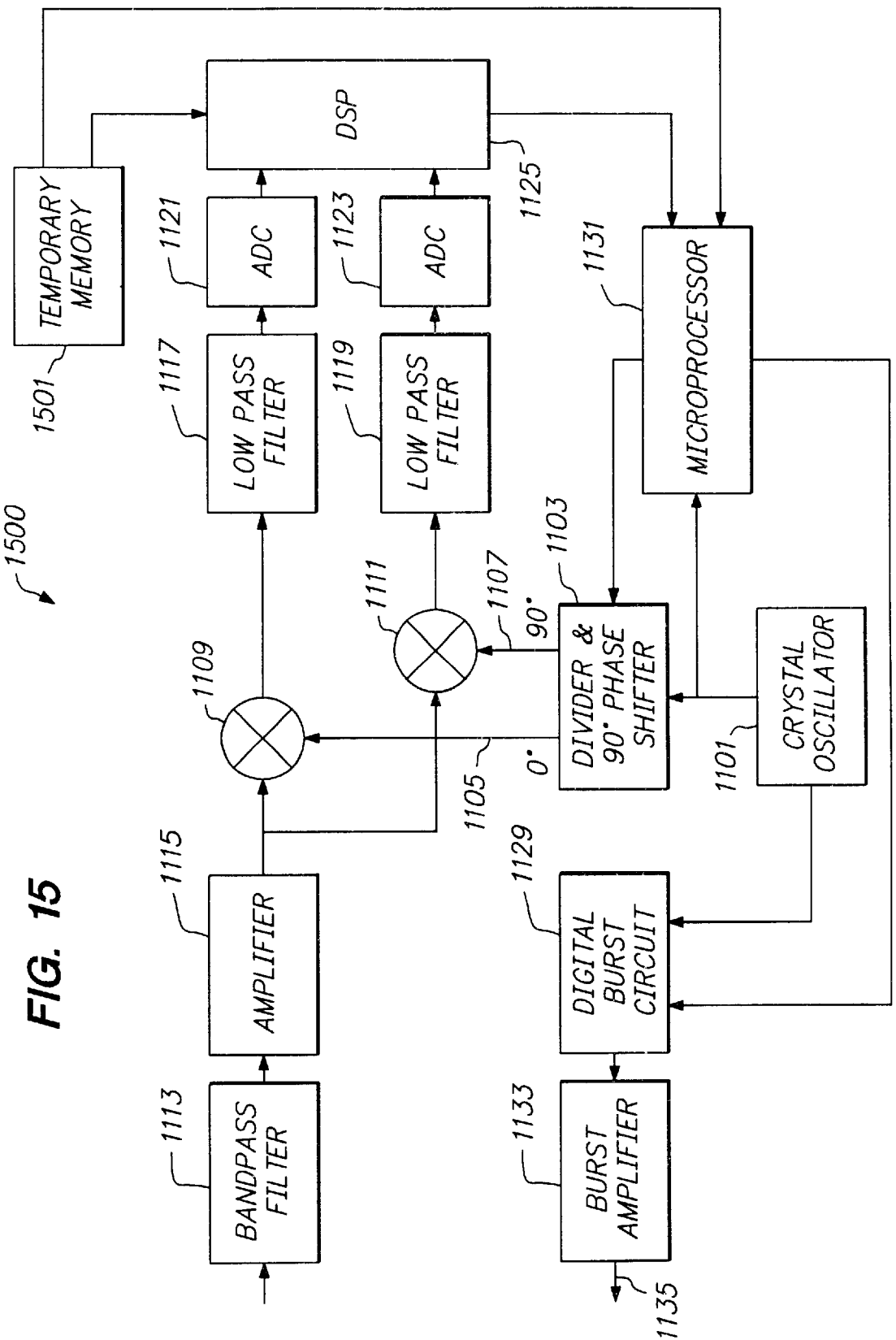
FIG. 15 schematically illustrates an adaptive controller according to the present invention to actively correct for both global and local variations.

FIGS. 14–15 illustrate another embodiment of the invention ideally suited for touchscreens that experience variations in the substrate acoustic wave velocity during use. For example as previously noted, the acoustic wave velocity characteristics of a polymer substrate may be temperature dependent. Therefore during use a polymer substrate based touchscreen may display both global variations (e.g., due to a change in the overall room temperature) or local variations (e.g., due to different portions of the screen being at different temperatures). The embodiment illustrated in FIGS. 14 and 15 is designed to accommodate such variations.

FIG. 14 is a flowchart illustrating the methodology of an embodiment in which a controller 1500 is coupled to a touchscreen requiring active adaptation. In this embodiment the first step is to determine whether or not a touch is sensed by the touchscreen (step 1401). If no touch is sensed, controller 1500 undergoes a testing sequence in which the frequency characteristics of the touchscreen are determined. Preferably the first step in this sequence is to determine how much time has passed since the last testing sequence (step 1403). If a preset time period has not been exceeded (step 1405), the system loops back to the starting point. If the preset time period has been exceeded, then the system measures the substrate frequency characteristics for the x- and y-coordinates of the substrate (step 1407) and determines a set of correction values (step 1409). These correction values are loaded into the memory of controller 1500 (step 1411) and the system loops back to the starting point (step 1413). Then, once a touch is sensed (step 1415), the system determines the touch coordinates (step 1417) and sends these coordinates to the operating system (step 1419).

Active adaptive controller 1500 is shown in FIG. 15. This controller is basically the same as controller 1100 except for a couple of minor alterations. For example, permanent memory 1127 is replaced by a temporary memory 1501. As in controller 1100, memory 1501 stores the frequency correction values required to correct for the characteristic frequency variations of the touchscreen. A temporary memory is required in this embodiment as controller 1500 periodically updates the correction values as described above. Additionally, as the memory must be periodically updated, it is bidirectionally linked to microprocessor 1131. Thus during the characteristic testing sequence, microprocessor 1131 uses the output of DSP 1125 to determine the desired frequency correction values, storing them in memory 1501.

As in the embodiment illustrated in FIG. 11, digital burst processor 1129 outputs a burst of the desired burst frequency. Additionally the power spectrum of the output burst is tailored according to the correction values stored in temporary memory 1501. A variety of techniques can be used to adjust the burst power spectrum including time modulating the phase of individual RF pulses (e.g., pulse phasing based on sin(x)/x curve), amplitude modulating a burst train (e.g., trapezoid envelop or stacking of digital pulse trains of different lengths), or using non-integral burst lengths in units of RF cycles.

Figure 16:
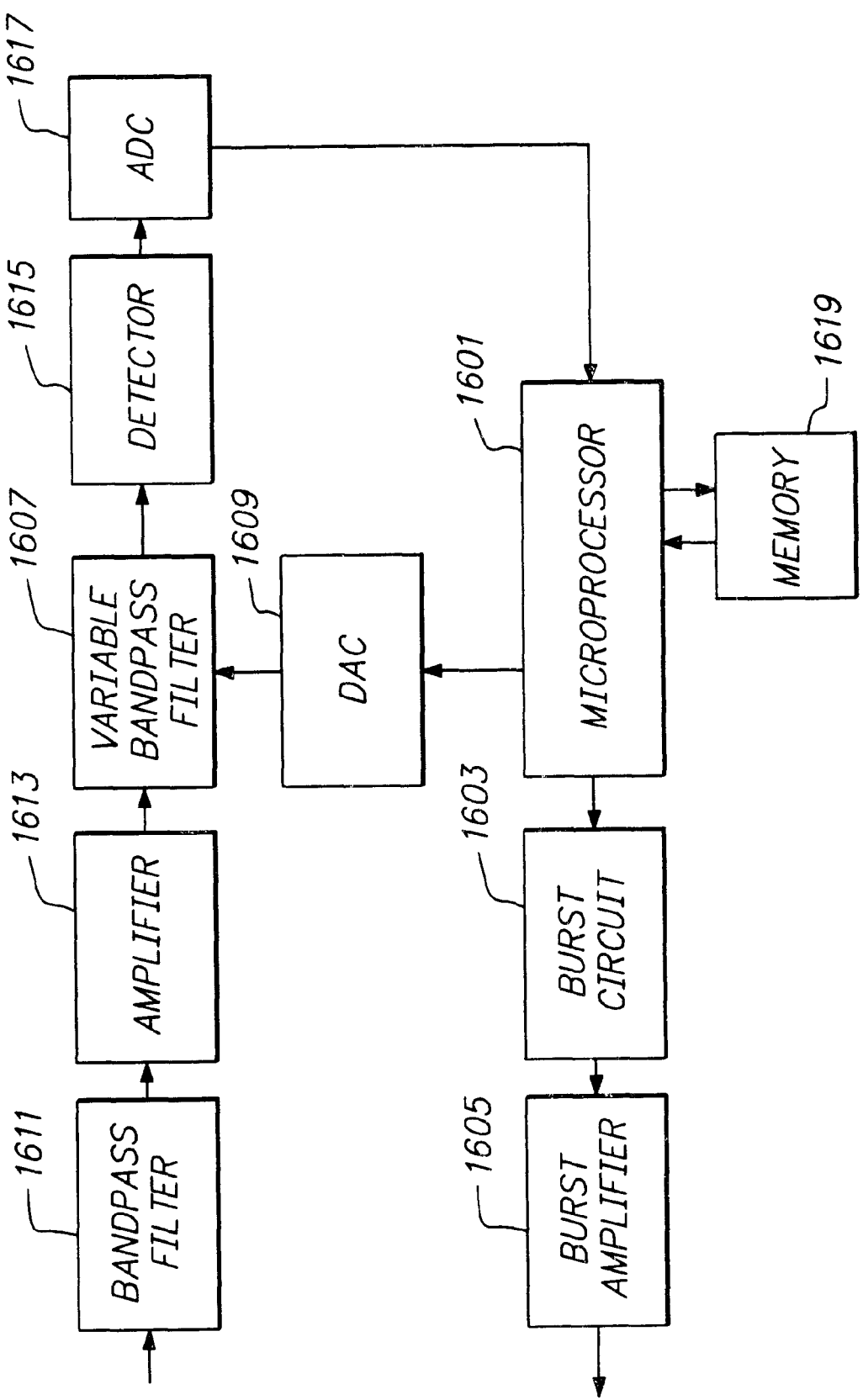
FIG. 16 schematically illustrates an adaptive controller according to the present invention in which only the receiver center frequency is adjusted.

In the embodiment illustrated in FIG. 16, only the center frequency with which the received signal is processed is adjusted, i.e., the frequency of the burst is not adjusted. This embodiment is applicable in cases in which there is no need to adjust the burst frequency, such as if the burst is very short, e.g., less than 10 RF cycles in duration, and is therefore sufficiently broadband to cover anticipated variations in the touchscreen characteristic frequencies.

As shown in FIG. 16, a microprocessor 1601 accepts the nominal RF operating frequency and triggers a burst circuit 1603 which, in turn, excites a transmit transducer (not shown). As in the previous embodiments, a burst amplifier 1605 may be used to condition the output of burst circuit 1603. The narrowest bandpass filter in the receiver circuit chain is a variable bandpass filter 1607. The center frequency of variable bandpass filter 1607 is controlled by a voltage provided by a D-A converter 1609 which, in turn, is controlled by microprocessor 1601. Appropriate circuit designs for a variable bandpass filter such as filter 1607 are well known by those of skill in the art and will therefore not be further described. The signal from the receive transducer (not shown) may be passed through a relatively broad bandpass filter 1611 and amplified by an amplifier 1613 prior to passing through variable bandpass filter 1607, filter 1607 defining the center frequency. The signal is then converted from RF to baseband by a detector 1615 and digitized with an A-D converter 1617. Microprocessor 1601 determines an optimal setting for D-A converter 1609, for example by using the procedure illustrated in FIG. 8. The optimal D-A converter setting is then stored in a memory 1619, microprocessor 1601 using the stored value during normal touch operation. Separate D-A converter values may be stored for x- and y-signals.

Figure 17:
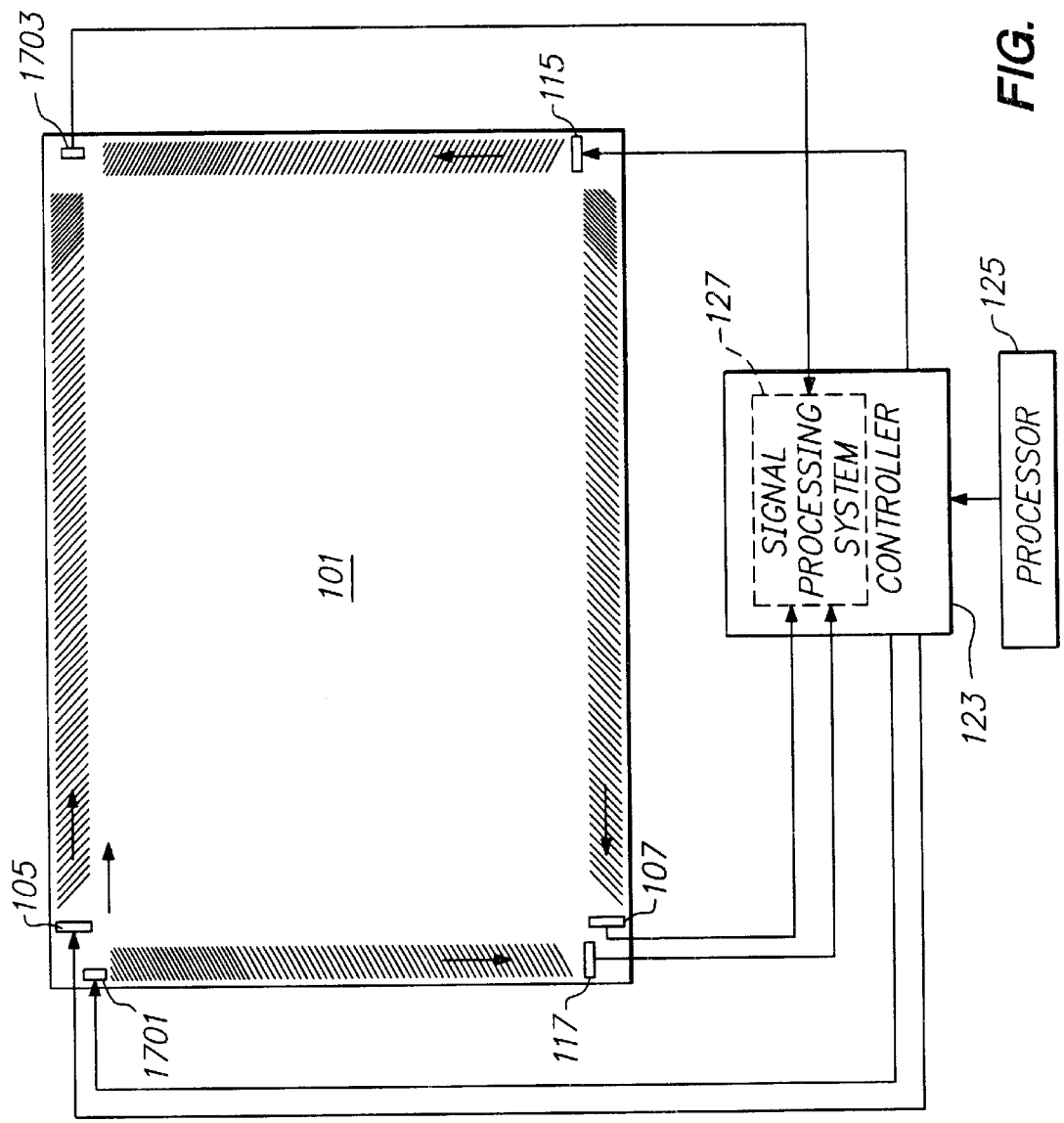
FIG. 17 is an illustration of an acoustic touchscreen utilizing an additional set of transducers for touchscreen characterization.

Preferably in each of the embodiments disclosed above, the transducers used during touch sensing, e.g., transducers 105, 107, 115, and 117, are also used to adapt the controller to the touchscreen. Thus, for example, the received signal resulting from an acoustic wave launched by transducer 105 and received by transducer 107 could either be used as a frequency reference for the adaptive controller of the present invention or to provide touch information in a manner which is the same as, or similar to, a conventional touchscreen. It should be understood, however, that the transducers that are used to determine the characteristic frequencies of the touchscreen in order to adapt the controller need not be the same as the transducers used for touch detection and information gathering. For example, as shown in FIG. 17, a pair of transducers 1701 and 1703 are used in a delay line feedback oscillator (not shown) to determine the characteristic frequencies of the touchscreen, these transducers being in addition to transducers 105, 107, 115, and 117 that are used during touch sensing. Alternately, separate transducers with separate reflective arrays can be provided on the back surface of the touchscreen substrate. Preferably the input and output of the additional transducers are multiplexed with lines 707 and 713 of controller 700, or the corresponding lines of controllers 1100, 1300, or 1500. This approach provides the freedom to optimize properties of the frequency reference signal independently of the needs of the touch sensing acoustic paths.

Although several embodiments of the invention have been described and illustrated above, it should be understood that other embodiments can be envisioned that use the adaptive methodology of the present invention. Additionally, it should be understood that various aspects of the embodiments shown above can be changed without departing from the invention. For example, the non-crystal reference oscillator and feedback loop used in the embodiment illustrated in FIG. 13 could be used in lieu of the crystal oscillator used in the embodiment illustrated in FIGS. 11–12. Thus the present invention may be embodied in other specific forms without departing from the spirit or essential characteristics thereof. Accordingly, the disclosures and descriptions herein are intended to be illustrative, but not limiting, of the scope of the invention which is set forth in the following claims.

what is claimed is:

1. A touchscreen system, comprising:
   a touchscreen substrate, said substrate capable of propagating acoustic waves;
   at least one transmitting transducer coupled to said substrate, said transmitting transducer initiating an acoustic wave of a first burst length in response to an input signal;
   a reflective array pattern comprised of a plurality of acoustic wave reflectors coupled to said substrate, said reflective array stretching said first burst length to form a second burst length acoustic wave;
   at least one receiving transducer coupled to said substrate, said receiving transducer receiving said acoustic wave of said second burst length; and
   an adaptive controller coupled to said at least one transmitting transducer and to said at least one receiving transducer, said adaptive controller comprising:
   a reference oscillator outputting a frequency;
   a first mixer coupled to said at least one receiving transducer and to said reference oscillator, said first mixer outputting a first mixer output signal;
   an IF bandpass filter coupled to said first mixer;
   a feedback loop circuit coupled to said IF filter and to said reference oscillator, said feedback loop circuit modifying said reference oscillator frequency;
   a second mixer coupled to said reference oscillator;
   an IF oscillator coupled to said second mixer;
   a microprocessor; and
   a burst circuit coupled to said second mixer, said microprocessor, and said at least one transmitting transducer, said burst circuit outputting said input signal to said at least one transmitting transducer.

2. The touchscreen system of claim 1, said feedback loop circuit further comprising a discriminator circuit coupled to said IF bandpass filter, said discriminator circuit outputting a control signal to said reference oscillator for controlling said reference oscillator frequency.

3. The touchscreen system of claim 2, said feedback loop circuit further comprising a sample and hold circuit.

4. The touchscreen system of claim 1, further comprising a detector coupled to said IF bandpass filter and to said microprocessor.

5. The touchscreen system of claim 1, wherein an IF oscillator frequency is substantially equivalent to a passband center frequency of said IF bandpass filter.

6. The touchscreen system of claim 1, wherein said reference oscillator frequency is greater than a characteristic frequency of said touchscreen.

7. The touchscreen system of claim 1, wherein at least a portion of said adaptive controller is bonded to said touchscreen substrate.

8. The touchscreen system of claim 1, wherein said reference oscillator is comprised of an oscillator circuit.

9. The touchscreen system of claim 8, wherein said reference oscillator further comprises a silicon chip, said silicon chip containing said oscillator circuit.

10. A method of controlling a touchscreen system including a touchscreen having a characteristic frequency, the method comprising the steps of:

generating a first frequency, wherein said first frequency is adjustable;

mixing an output from a receiving transducer with said first frequency to produce a second frequency;

passing said second frequency through a band pass filter;

comparing said filtered second frequency to said touchscreen characteristic frequency; and adjusting said first frequency until said filtered second frequency is substantially equivalent to said desired frequency.

11. The method of claim 10, wherein said second frequency is approximately 500 kHz.

12. The method of claim 10, further comprising the steps of:

setting said first frequency to an initial frequency upon system initialization;

ramping said first frequency from said initial frequency through a range of frequencies; and discontinuing said ramping step when said filtered second frequency is within a predetermined distance from said desired frequency.

13. The method of claim 10, further comprising the steps of:

mixing said first frequency with an IF oscillator output to produce a third frequency;

transmitting said third frequency to a burst circuit;

generating a burst signal; and transmitting said burst signal to a transmitting transducer coupled to said touchscreen system.

* * * * *